US011970099B2

(12) United States Patent
Bielsa Bonet

(10) Patent No.: US 11,970,099 B2
(45) Date of Patent: Apr. 30, 2024

(54) SLEEVE DEVICE FOR A HEADREST

(71) Applicant: ILLINOIS TOOL WORKS INC., Glenview, IL (US)

(72) Inventor: Jordi Bielsa Bonet, Folgueroles (ES)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/691,284

(22) Filed: Mar. 10, 2022

(65) Prior Publication Data
US 2022/0289087 A1 Sep. 15, 2022

(30) Foreign Application Priority Data

Mar. 11, 2021 (EP) .................................. 21382197
Mar. 10, 2022 (EP) .................................. 22161251

(51) Int. Cl.
*B60N 2/897* (2018.01)
*B60N 2/809* (2018.01)

(52) U.S. Cl.
CPC ............. *B60N 2/897* (2018.02); *B60N 2/809* (2018.02)

(58) Field of Classification Search
CPC .................................................... B60N 2/897
See application file for complete search history.

(56) References Cited

U.S. PATENT DOCUMENTS

| 5,788,250 | A | * | 8/1998 | Masters | B60N 2/826 297/391 |
| 5,816,658 | A | * | 10/1998 | Wallis | B60N 2/815 297/391 |
| 5,944,170 | A | | 8/1999 | LaVeine | |
| 6,296,316 | B1 | * | 10/2001 | Hann | B60N 2/821 297/391 |
| 7,165,814 | B2 | | 1/2007 | Gans | |
| 7,370,915 | B2 | | 5/2008 | Droche | |
| 9,902,301 | B2 | * | 2/2018 | Aquillue | B60N 2/809 |
| 2006/0012225 | A1 | | 1/2006 | Gans | |
| 2006/0119163 | A1 | | 6/2006 | Gans | |
| 2020/0130549 | A1 | * | 4/2020 | Izumida | B60N 2/809 |

FOREIGN PATENT DOCUMENTS

| CN | 201961194 U | 9/2011 |
| DE | 29801357 U1 | 6/1998 |
| EP | 0875471 A1 | 11/1998 |

(Continued)

*Primary Examiner* — David R Dunn
*Assistant Examiner* — Tania Abraham
(74) *Attorney, Agent, or Firm* — THOMPSON HINE LLP

(57) ABSTRACT

A sleeve device for a headrest includes a sleeve body for insertion into a vehicle seat. The sleeve body includes a tubular wall describing an inner axial passage configured to receive a rod of the headrest, and having an upper portion, a lower portion, and a central portion between the upper and lower portions; and at least one elongate rib member overmoulded to an inner surface or an outer surface of the tubular wall and extending along the tubular wall, preferably between the lower portion and the upper portion, wherein the at least one rib member is configured to contact an outer surface of the rod when extending along the inner surface, or is configured to engage an external component, for example the frame of the vehicle seat, when extending along the outer surface.

12 Claims, 3 Drawing Sheets

(56) References Cited

FOREIGN PATENT DOCUMENTS

| | | | |
|---|---|---|---|
| EP | 1609665 | A2 | 12/2005 |
| EP | 1652723 | A2 | 5/2006 |
| FR | 2917681 | A1 | 12/2008 |
| FR | 2936749 | A1 | 4/2010 |
| JP | H-1089665 | A | 4/1998 |
| WO | WO-2016166009 | A1 | 10/2016 |

* cited by examiner

SLEEVE DEVICE FOR A HEADREST

TECHNICAL FIELD

The invention relates to a sleeve device for a headrest. In particular, the invention relates to a sleeve device for an automotive headrest.

BACKGROUND

The sleeve device for headrests used in automotive applications typically comprise a tubular body which receives a rod of the headrest, and a head portion which engages with the rod to secure the rod in place. The tubular body is received in a vehicle seat frame, and the head portion sits above a cushion of the seat.

Generally, the sleeve device is designed for a specific vehicle seat frame and for a specific configuration of rod, or at least a specific, narrow range of frame and rod configuration. Accordingly, there are many designs of sleeve device available, and a new design of seat and/or rod requires an alteration to the sleeve device design. The interaction between the sleeve device and the rod must be sufficiently tight to reduce rattling but must also be sufficiently loose to enable the rod to be moveable axially within the sleeve device if a user wishes to alter the height of the headrest. Often, moving the headrest is difficult due to misalignment of the rod inside of the sleeve device, or due to a tight fit of the rod within the tubular device. The sleeve device must also fit tightly into the seat frame, to prevent rattling and to ensure that the sleeve device does not become loose during adjustment of the head rest. Therefore, sleeve devices must be manufactured within a tight tolerance to achieve the optimum interaction between the sleeve device and the rod, and between the sleeve device and the seat frame. Nevertheless, rattling and difficulty in adjusting the headrest is still common in these components, which can cause annoyance and discomfort to users.

SUMMARY

According to the present invention, there is provided a sleeve device for a headrest comprising a sleeve body for insertion into a vehicle seat, the sleeve body comprising a tubular wall describing an inner axial passage configured to receive a rod of the headrest, and having an upper portion, a lower portion, and a central portion between the upper and lower portions; and at least one elongate rib member overmoulded to an inner surface or an outer surface of the tubular wall and extending along the tubular wall, preferably between the lower portion and the upper portion, wherein the at least one rib member is configured to contact an outer surface of the rod when extending along the inner surface, or is configured to engage an external component, for example the frame of the vehicle seat, when extending along the outer surface.

The upper, lower and central portions may be of substantially equal lengths.

The sleeve body may further comprise a head portion located at an uppermost end of the tubular wall. The head portion may extend radially outwardly from the tubular wall. The head portion may be configured to engage with the rod, for example to releasably secure the rod into a position along the inner axial passage.

The sleeve body may comprise an elongate tubular wall. The at least one elongate rib member may extend in a direction parallel to the longitudinal axis of the elongate tubular wall.

The sleeve device may comprise a plurality of elongate rib members overmoulded to the inner surface or the outer surface of the tubular wall and extending along tubular wall, preferably between the lower portion and the upper portion. The rib members may be spaced circumferentially around the inner surface or the outer surface of the tubular wall.

The or each rib member may provide a sliding surface for the movement of the rod along the inner axial passage. The or each rib member may be provided by antifriction resilient material. The or each rib member may be provided by soft plastic material. The or each rib member may be made of a material selected from thermoplastic elastomers, thermoplastic polyurethanes and styrene ethylbutylene styrene. The or each rib member may prevent misalignment of the rod as the rod is moved along the inner axial passage. The or each rib member may damp or attenuate vibrations transmitted between the sleeve device and the rod. The or each rib member may damp or attenuate vibrations transmitted between the sleeve device and the external component. The or each rib member may increase the permitted tolerance between the sleeve and the rod or between the sleeve and the external component. The or each rib member may provide the optimum tightness of fit between the sleeve device and the rod, or between the sleeve device and the external component, such that rattling is reduced while a user can move the rod along the inner axial passage. The or each rib member may provide cushioning between the sleeve device and the rod, or between the sleeve device and the external component to improve the comfort of the headrest to the user. The or each rib member may provide standardisation of the sleeve device, such that the sleeve device can be used with numerous configurations of rod or external component.

The or each rib member may extend from a lower end of the tubular wall to the upper portion of the tubular wall. The or each rib member may extend from an upper end of the tubular wall to the lower portion of the tubular wall. The or each rib member may extend from a lower end to an upper end of the tubular wall.

The tubular wall may comprise at least one aperture through which the at least one rib member extends to provide an outer portion or an inner portion of the at least one rib member. The outer portion may be overmoulded to the outer surface of the tubular wall and configured to engage an external component, for example a frame of the vehicle seat. The inner portion may be overmoulded to the inner surface of the tubular wall and configured to contact the outer surface of the rod.

The tubular wall may comprise a plurality of apertures spaced along the at least one rib member, such that the at least one rib member extends through the plurality of apertures to provide a plurality of outer portions overmoulded to the outer surface of the tubular wall and configured to engage the external component, for example the frame of the vehicle seat or to provide a plurality of inner portions overmoulded to the inner surface of the tubular wall and configured to contact the outer surface of the rod.

The or each outer portion or inner portion may be an elongate rib section. The or each outer portion or inner portion may be aligned longitudinally with the tubular wall.

One of the outer portions or inner portions may be located in any or each of the upper, central and lower portions of the tubular wall.

The at least one rib member may be overmoulded to the inner surface of the tubular wall, and the at least one rib may be a part of a covering which is overmoulded to the inner surface of the tubular wall such that the at least one rib member protrudes from the covering and into the inner axial passage.

The covering may extend from the lower end of the tubular wall to the upper portion of the tubular wall. The covering may extend from the upper end of the tubular wall to the lower portion of the tubular wall. The covering may extend from the lower end to the upper end of the tubular wall. The covering may extend around the entire circumference of the inner surface of the tubular wall. The covering may extend around a part of the circumference of the inner surface of the tubular wall. The covering may connect any two of a plurality of rib members. At least one aperture may extend through the tubular wall at any location thereon, and the covering may extend through the at least one aperture to provide the outer portion/s.

The or each outer portion may provide a sliding, or engagement surface. The or each outer portion may be provided by antifriction resilient material. The or each outer portion may be provided by soft plastic material. The or each outer portion may be made of a material selected from thermoplastic elastomers, thermoplastic polyurethanes and styrene ethylbutylene styrene. The or each outer portion may damp or attenuate vibrations transmitted between the sleeve device and the seat frame. The or each outer portion may increase the permitted tolerance of fit between the sleeve device and the seat frame. The or each outer portion may provide standardisation of the sleeve device, such that the sleeve device can be used with numerous configurations of seat frame.

BRIEF DESCRIPTION OF DRAWINGS

Example embodiment(s) of the invention are illustrated in the accompanying drawings, in which.

DESCRIPTION

Figure 1:
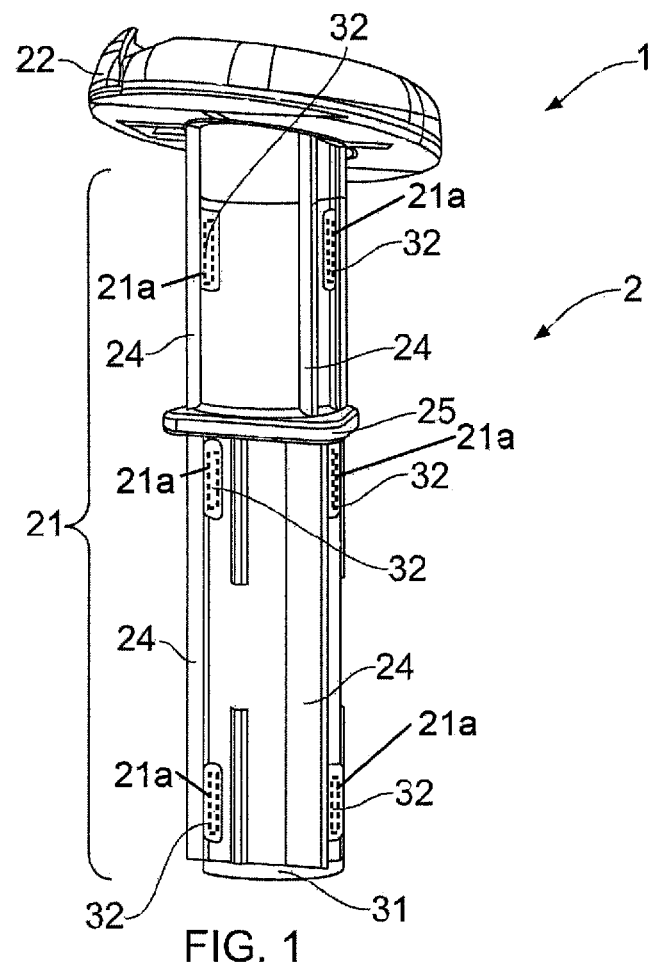
FIG. 1 illustrates a perspective view of the sleeve device.

Certain terminology is used in the following description for convenience only and is not limiting. The words 'right', 'left', 'lower', 'below', 'upper', 'above', 'front', 'rear', 'upward', 'down' and 'downward' designate directions in the drawings to which reference is made and are with respect to the described component when assembled and mounted. In particular, these terms correspond to the orientation of the sleeve device 1 when in use in ordinary use in an automotive vehicle. The words 'inner', 'inwardly' and 'outer', 'outwardly' refer to directions toward and away from, respectively, a designated centreline or a geometric centre of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

Like reference numerals are used to depict like features throughout.

The illustrative embodiment relates to a sleeve device for a headrest.

The mounting member is intended for use in a headrest in an automotive vehicle. However, the sleeve device can be used with any suitable headrest, for example in aeroplanes, locomotives or marine vessels.

Figure 2:
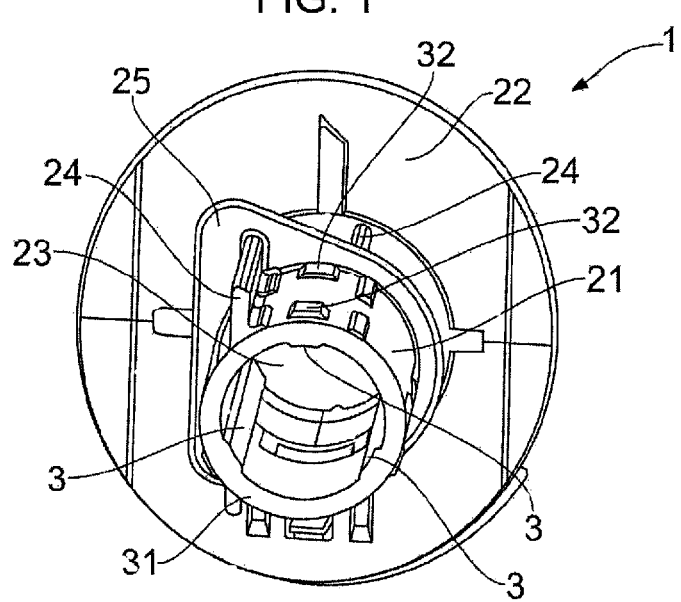
FIG. 2 illustrates a bottom view of the sleeve device.
Figure 3:
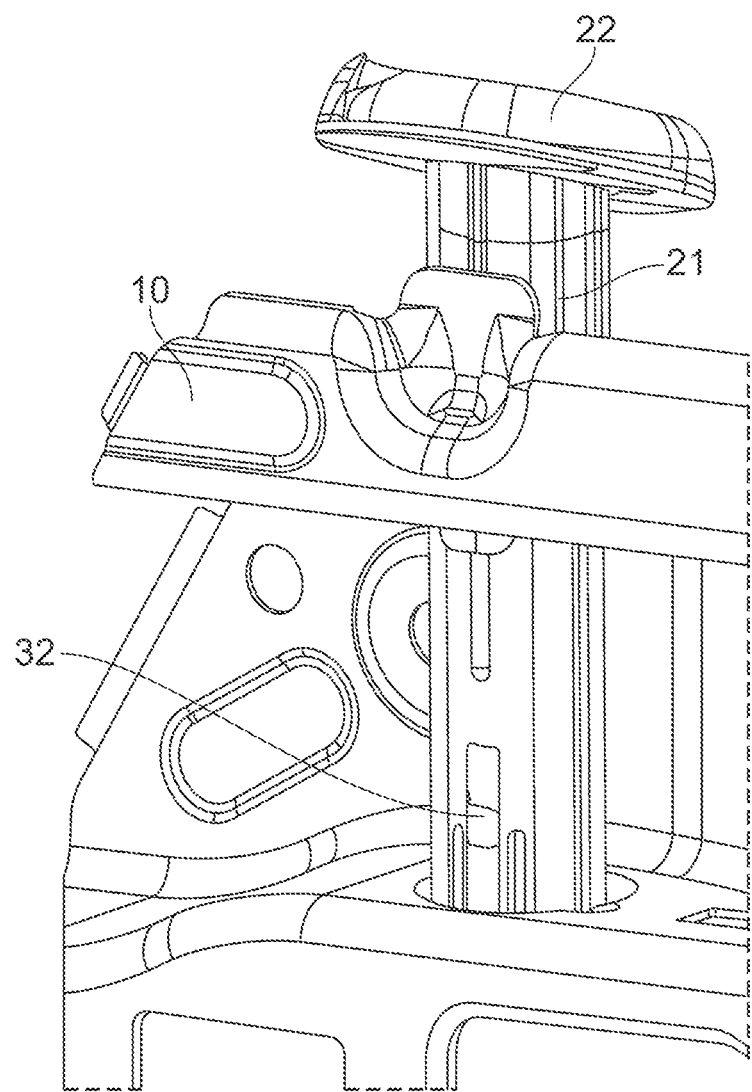
FIG. 3 illustrates the sleeve device located in a vehicle seat.

Referring to FIGS. 1 to 3, there is shown a sleeve device 1 for a headrest (not shown). The sleeve device 1 has a sleeve body 2 comprising a tubular wall 21 and a head portion 22 at an upper end of the tubular wall 21. In use, the sleeve body 2 is inserted into a frame 10 of a seat of a vehicle. The head portion 22 abuts a top surface of a cushion (not shown) of the seat, in use, such that side surfaces and a top surface of the head portion 22 are accessible to a user. The tubular wall 21 and head portion 22 describe an inner axial passage 23 therein, the inner axial passage 23 being configured to receive a rod (not shown) of the headrest. The head portion 22 comprises a known latching mechanism which engages with the rod, such that the rod is moveable along the inner axial passage to set the height of the headrest. The sleeve body 2 comprises a plurality of guides 24 which project radially outwardly from the tubular wall 21 and extend along the length direction thereof. The guides 24 interact with corresponding slots or features (not shown) located in the frame 10 to orientate and/or secure the sleeve device 1 into the frame 10. The sleeve body 2 comprises a flange 25 extending radially outwardly from the tubular wall 21 and around the circumference thereof. The flange 25 interacts with the frame 10 to locate and/or secure the sleeve device 1 into the frame 10.

Extending longitudinally along an inner surface of the tubular wall 21 are three elongate rib members 3. The rib members 3 are equally spaced around the tubular wall 21. In this example the rib members 3 extend along the entirety of the inner axial passage 23, but the rib members 3 may instead extend along the majority of the length of the inner axial passage 23. The tubular wall 21 may be considered to be divided, along the length, into a lower portion, a central portion and an upper portion, all of substantially equal length, and each rib 23 extends at least from the lower portion to the upper portion. The rib members 3 protrude from the inner surface of the tubular wall 21 into the inner axial passage 23. The rib members 3 are connected to each other by a ring 31 located at a lowermost end of the tubular wall 21. Whilst three rib members 3 are provided in this example, it will be appreciated that any suitable number of rib members 3 may be provided.

The tubular wall 21 comprises a plurality of apertures 21a (shown in dashed line form) therethrough, located along the length of each rib member 3. A portion of the rib members 3 extends through the apertures to provide an outer portion 32 thereof. The outer portions 32 are located on an outer surface of the tubular wall 21. The outer portions 32 are elongate in shape and extend, and are spaced apart, along the tubular wall 21. A line of three outer portions 32 is located correspondingly to each rib member 3 such that the line of outer portions 32 and the respective rib member 3 are located opposingly on either side of the tubular wall 21. The outer portions 32 protrude from the outer surface of the tubular wall 21. Along each line of outer portions 32, there is an outer portion 32 located in each of the lower, central, and upper portion of the tubular wall 21. The outer portions 32 located in the central portion are positioned below the flange 25. Whilst three outer portions 32 are provided in each line in this example, it will be appreciated that any number of apertures and corresponding outer portions 32 may be provided. Similarly, the length of each outer portion 32 may be different to that shown in the figures, or one of more outer portion 32 in each line may be connected. All of the outer portions 32 may be connected to provide an outer rib member (not shown) extending along the outer surface of the tubular wall 21.

Preferably the tubular wall 21 and head portion 22 are moulded using a rigid thermoplastic material. The head portion 22 may be moulded in multiple parts and assembled thereafter. The rib members 3, ring 31 and outer portions 32 are overmoulded onto the tubular wall 21. This process is sometimes referred to, in the art, as 2K moulding (i.e. two components). During the overmoulding process the overmoulded material passes through the apertures in the tubular wall 21 such that each outer portion 32 is connected to a respective rib member 3 through the respective aperture. The ring 31 is overmoulded to the lowermost end of the tubular wall 21.

The rib members 3, ring 31 and outer portions 32 are manufactured using an antifriction resilient and soft plastic material. The rib members 3, ring 31 and outer portions 32 are preferably made of a material selected from thermoplastic elastomers, thermoplastic polyurethanes and styrene ethylbutylene styrene. The rib members 3 and outer portions 32 provide inner and outer bushings respectively, as described in more detail subsequently.

In use, the sleeve device 1 is inserted into a vehicle frame 10 such that the guides 24 and flange 25 interact with the frame 10, as described previously. The outer portions 32 engage with the frame 10. Due to the resilient material used for the outer portions 32, the outer portions 32 may be compressed when the sleeve device 1 is connected to the vehicle frame 10. This compressibility means that the permitted tolerance of interacting parts of the frame 10 and/or the sleeve device 1 may be increased. Furthermore, by providing rib sections located along the length of the tubular wall 21, the sleeve device 21 may be standardised for different configurations of vehicle seat frame 10. This is because the outer portions 32 can be located such that any number are engaged with specific configurations of vehicle seat frame 10. The interaction between the outer portions 32 and the frame 10 also provide damping and vibration attenuation. This reduces the amount of rattling noise emitted from the interaction between the sleeve device 1 and the frame 10.

The headrest rod is inserted into the inner axial passage 23, preferably when the sleeve device 1 is located in the seat frame 10. The rod slides along the rib members 3. The rib members 3 maintain alignment of the rod during movement along the inner axial passage 23. The maintained alignment, and the antifriction material used for the rib members 3, means that minimal resistance is offered to the movement of the rod. The resilient material of the rib members 3 compresses when the rod is inserted. This compressibility allows a greater permitted tolerance of interacting parts of the rod and the sleeve device 1. The sleeve device 1 can also be standardised for a greater range of rod diameters. The resilient material of the rib members 3 provides damping and vibration attenuation. This reduces the amount of rattling noise emitted from the interaction between the sleeve device 1 and the headrest rod. Also, variability in the extent to which the rib members 3 protrude into the inner axial passage, and the stiffness of the rib members 3, allows the tightness of fit between the rod and the rib members 3 to be optimised such that it is as tight as possible, thus reducing rattling, whilst permitting movement of the headrest rod along the inner axial passage 23. The compressibility of the resilient material of the rib members 3 also increases the comfort of the headrest for the user. This is because the headrest rod is typically manufactured using metal, and so vibrations caused due to contact between the metal rod and another hard surface cause the vibrations to travel along the rod. By damping this contact, vibrations are not transmitted along the metal rod to a user of the headrest.

The ring 31 connects the rib members 3 together and may prevent the rib members 3 from disconnecting from the tubular wall 21. The ring 31 may also provide a bushing to aid inserting the tubular wall 21 into the frame 10. The ring 31 may also abut a part of the seat frame to damp and attenuate vibrations therefrom.

Whilst the frame 10 shown in FIG. 3 comprises adjacent bars with holes passing through with the sleeve device 1 passing through the holes, any vehicle seat frame is envisaged. For example, the frame may comprise tubes welded to the frame with the sleeve device 1 being received in the tubes. The guides 24 and flange 25 may be arranged to suit the specific vehicle frame, and either or both of the guides 24 or flange 25 may be omitted.

Figure 4:
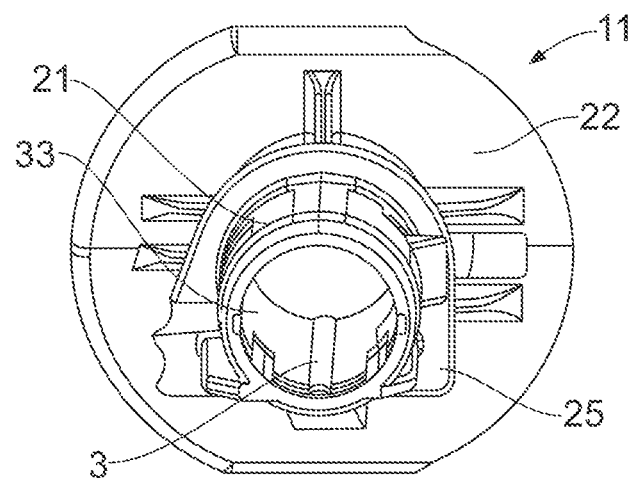
FIG. 4 illustrates an alternative example of the sleeve device.
Figure 5:
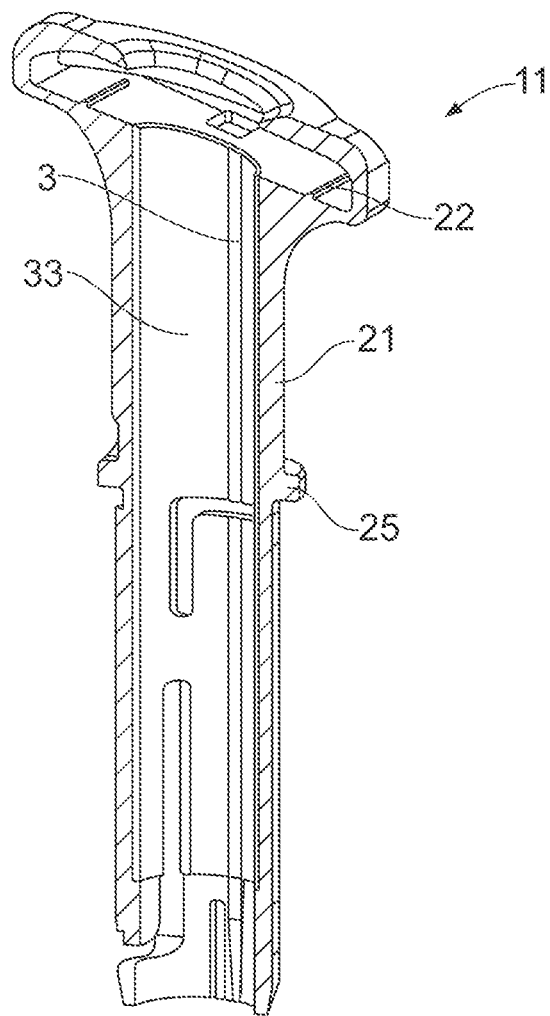
FIG. 5 illustrates a cross-section view of the sleeve device shown in FIG. 4.

Referring now to FIGS. 4 and 5, another example of the sleeve device 11 is shown. The sleeve device 11 is the same as the sleeve device 1 described with reference to FIGS. 1 to 3, except that a covering 33 is overmoulded to the inner surface of the tubular wall 21. In this example the covering 33 extends between the upper end of the tubular wall 21 and the lower portion of the tubular wall, and around the entire circumference of the inner surface. However, it will be appreciated that the covering 33 may extend over any length of the tubular wall 21, and around any amount of the circumference of the inner surface. The rib members 3 are a part of the covering 33 and protrude into the inner axial passage from the covering 33. The covering 33 may be an antifriction resilient material. The covering 33 may be provided by soft plastic material. The covering 33 may be made of a material selected from thermoplastic elastomers, thermoplastic polyurethanes and styrene ethylbutylene styrene. In this example there are no outer portions present. However, the sleeve device 11 may comprise outer portions overmoulded to the outer surface of the tubular wall 21, which are moulded with the covering and rib members 3, through apertures in the tubular wall 21, similar to in the previous example. Advantageously, the outer portions in this example may be at any location on the tubular wall, and not necessarily in line with the rib members 3. Providing a covering 33 advantageously connects the rib members 3 together.

It will be appreciated by persons skilled in the art that the above embodiment(s) have been described by way of example only and not in any limitative sense, and that various alterations and modifications are possible without departing from the scope of the invention as defined by the appended claims. Various modifications to the detailed designs as described above are possible.

The invention claimed is:

1. A sleeve device for a headrest comprising a sleeve body for insertion into a vehicle seat, the sleeve body comprising:
a tubular wall defining an inner axial passage configured to receive a rod of the headrest, and having an upper portion, a lower portion, and a central portion between the upper and lower portions; and
at least one elongate rib member overmoulded to an inner surface or an outer surface of the tubular wall, the at least one elongate rib member extending along the tubular wall, between the lower portion and the upper portion, wherein the at least one elongate rib member is configured to contact an outer surface of the rod when extending along the inner surface, or is configured to engage an external component, when extending along the outer surface;
wherein the tubular wall comprises at least one aperture through which the material of the at least one rib member extends to provide an outer portion or an inner portion of the at least one rib member, the outer portion being overmoulded to the outer surface of the tubular wall and configured to engage the external component, or the inner portion being overmoulded to the inner surface of the tubular wall and configured to contact the outer surface of the rod;
wherein the tubular wall comprises a plurality of apertures spaced along the at least one rib member, such that the at least one rib member extends through the plurality of apertures to provide a plurality of outer portions overmoulded to the outer surface of the tubular wall and configured to engage the external component, or to provide a plurality of inner portions overmoulded to the inner surface of the tubular wall and configured to contact the outer surface of the rod.

2. A sleeve device according to claim 1, wherein the sleeve body further comprises a head portion located at an uppermost end of the tubular wall, the head portion extending radially outwardly from the tubular wall and configured to engage with the rod.

3. A sleeve device according to claim 1, wherein the tubular wall is an elongate tubular wall and wherein the at least one elongate rib member extends in a direction parallel to a longitudinal axis of the elongate tubular wall.

4. A sleeve device according to claim 1, comprising a plurality of elongate rib members overmoulded to the inner surface or the outer surface of the tubular wall and extending along the tubular wall, between the lower portion and the upper portion, the rib members being spaced circumferentially around the inner surface or the outer surface of the tubular wall.

5. A sleeve device according to claim 1, wherein the or each outer portion or inner portion is an elongate rib section aligned longitudinally with the tubular wall.

6. A sleeve device according to claim 1, wherein one of the outer portions or inner portions is located in each of the upper, central and lower portions of the tubular wall.

7. A sleeve according to claim 1, wherein the at least one rib member is overmoulded to the inner surface of the tubular wall, and wherein the at least one rib is a part of a covering which is overmoulded to the inner surface of the tubular wall such that the at least one rib member protrudes from the covering and into the inner axial passage.

8. The sleeve device of claim 1, further comprising at least one guide projecting radially outwardly from the tubular wall and configured for orienting the sleeve device.

9. A sleeve device for a headrest comprising a sleeve body for insertion into a vehicle seat, the sleeve body comprising:
a tubular wall defining an inner axial passage configured to receive a rod of the headrest, and having an upper portion, a lower portion, and a central portion between the upper and lower portions;
at least one outer elongate rib member overmoulded to an outer surface of the tubular wall and extending along the tubular wall, wherein the at least one outer elongate rib member is configured to engage a vehicle seat frame when extending along the outer surface; and
at least one guide projecting radially outwardly from the tubular wall and configured for orienting the sleeve device, wherein the at least one guide extends radially outward farther than the at least one outer elongate rib member.

10. The sleeve device of claim 9, further comprising at least one inner elongate rib member at an inner surface of the tubular wall and extending along the tubular wall, the at least one inner elongate rib member configured to contact an outer surface of the rod when extending along the inner surface.

11. The sleeve device of claim 10, wherein the at least one inner elongate rib member is circumferentially aligned, relative to the tubular wall, with the at least one outer elongate rib member.

12. A sleeve device for a headrest comprising a sleeve body for insertion into a vehicle seat, the sleeve body comprising:
a tubular wall defining an inner axial passage configured to receive a rod of the headrest, and having an upper portion, a lower portion, and a central portion between the upper and lower portions;
at least one elongate rib member overmoulded to an inner surface or an outer surface of the tubular wall and extending along the tubular wall, between the lower portion and the upper portion, wherein the at least one elongate rib member is configured to contact an outer surface of the rod when extending along the inner surface, or is configured to engage an external component, when extending along the outer surface;
wherein the tubular wall comprises at least one aperture through which a material of the at least one rib member extends to provide an outer portion or an inner portion of the at least one elongate rib member, the outer portion being overmoulded to the outer surface of the tubular wall and configured to engage the external component, or the inner portion being overmoulded to the inner surface of the tubular wall and configured to contact the outer surface of the rod; and
at least one guide projecting radially outwardly from the tubular wall and configured for orienting the sleeve device, wherein the at least one guide extends radially outward from the tubular wall farther than the outer portion of the at least one elongate rib member.

* * * * *